(12) United States Patent
Ben Hamida et al.

(10) Patent No.: US 9,389,303 B2
(45) Date of Patent: Jul. 12, 2016

(54) METHOD AND SYSTEM FOR USING INDIRECT PATHS OF ULTRA WIDEBAND SIGNALS TO LOCALIZE A WIRELESS COMMUNICATION NODE ON A BODY

(75) Inventors: Elyes Ben Hamida, Grenoble (FR); Benoît Denis, Grenoble (FR); Laurent Ouvry, Le Versoud (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 526 days.

(21) Appl. No.: 13/824,964

(22) PCT Filed: Aug. 23, 2011

(86) PCT No.: PCT/EP2011/064420
§ 371 (c)(1),
(2), (4) Date: May 15, 2013

(87) PCT Pub. No.: WO2012/034832
PCT Pub. Date: Mar. 22, 2012

(65) Prior Publication Data
US 2013/0222185 A1    Aug. 29, 2013

(30) Foreign Application Priority Data
Sep. 16, 2010 (FR) ...................... 10 57425

(51) Int. Cl.
*G01S 3/02* (2006.01)
*G01S 5/02* (2010.01)
*G01S 5/06* (2006.01)
*G01S 5/10* (2006.01)
*G01S 5/14* (2006.01)

(52) U.S. Cl.
CPC ............. *G01S 5/0289* (2013.01); *G01S 5/0215* (2013.01); *G01S 5/0273* (2013.01); *G01S 5/06* (2013.01); *G01S 5/10* (2013.01); *G01S 5/14* (2013.01)

(58) Field of Classification Search
CPC ............. G01S 3/20; G01S 13/00; G01S 5/10; G01S 5/14; G01S 5/0273; G01S 5/06
USPC ......................................... 342/453, 21, 450
See application file for complete search history.

(56) References Cited

U.S. PATENT DOCUMENTS

| | | | |
|---|---|---|---|
| 7,397,379 B2 * | 7/2008 | Richards | ................... G01S 1/20 340/539.13 |
| 8,055,021 B2 | 11/2011 | Caritu et al. | |

(Continued)

FOREIGN PATENT DOCUMENTS

| | | |
|---|---|---|
| WO | 2005096568 A1 | 10/2005 |
| WO | 2007067821 A2 | 6/2007 |

(Continued)

OTHER PUBLICATIONS

F. Althaus et al., "Geo-Regioning for UWB Networks", 5 pages.
(Continued)

*Primary Examiner* — Harry Liu
(74) *Attorney, Agent, or Firm* — Baker & Hostetler LLP

(57) ABSTRACT

A method and a system are provided which are able to utilize indirect paths of signals of UWB type to locate a wireless communication node possessed by a body. The present method and system can notably apply to cooperative body networks implementing several wireless nodes able to communicate with one another.

7 Claims, 9 Drawing Sheets

(56) References Cited

U.S. PATENT DOCUMENTS

| | | | |
|---|---|---|---|
| 8,907,782 B2* | 12/2014 | Baker | H04W 4/02 340/539.12 |
| 2002/0196187 A1 | 12/2002 | Holt | |
| 2003/0060166 A1 | 3/2003 | Rosenfeld | |
| 2005/0179591 A1 | 8/2005 | Bertoni et al. | |
| 2008/0077326 A1 | 3/2008 | Funk et al. | |
| 2008/0198072 A1 | 8/2008 | Elwell et al. | |
| 2008/0223131 A1* | 9/2008 | Vannucci | A61B 5/112 73/510 |
| 2008/0262772 A1* | 10/2008 | Luinge | A61B 5/1114 702/94 |
| 2010/0179438 A1* | 7/2010 | Heneghan | A61B 5/0205 600/484 |
| 2011/0025562 A1* | 2/2011 | Hol | G01S 5/0247 342/387 |
| 2011/0163905 A1 | 7/2011 | Denis et al. | |

FOREIGN PATENT DOCUMENTS

| | | |
|---|---|---|
| WO | 2007093641 A2 | 8/2007 |
| WO | 2008143379 A1 | 11/2008 |
| WO | 2009077510 A1 | 6/2009 |

OTHER PUBLICATIONS

F. Althaus et al., "UWB Geo-Regioning in Rich Multipath Environment", IEEE, 2005, pp. 1001-1005.

A. Fort et al., "Ultra Wide-Band Body Area Channel Model", pp. 2840-2844.

A. Fort et al., "Ultra-Wideband Channel Model for Communication Around the Human Body", IEEE Journal on Selected Areas in Communication, Apr. 2006, vol. 24, No. 4, pp. 927-933.

V. La Tosa et al., "Maximum Averaged Likelihood Estimation Tree for Anchor-Less Localization Exploiting IR-UWB Multipaths", 5 pages.

MacAgnano et al., "MAC Performances for Localization and Tracking in Wireless Sensor Networks", 4th IEEE Workshop on Positioning, Navigation and Communication, 2007, pp. 297-307.

M. Najar et al., "Kalman Tracking for Mobile Location in NLOS Situations", The 14th IEEE International Symposium on Persona, Indoor and Mobile Radio Communication Proceedings, , 2003, pp. 2203-2207.

J. Youssef et al., "Enhanced UWB Indoor Tracking through NLOS TOA Biases Estimation", IEEE GLOBCOM, 2008, pp. 1-5.

T. Zasowski et al., "Propagation Effects in UWB Body Area Networks", pp. 16-21.

B. Denis et al., "Advanced Bayesian Filtering Techniques for UWB Tracking Systems in Indoor Environments", pp. 638-643.

C. Steiner et al., "On the Performance of UWB Geo-Regioning" 5 pages.

B. Denis, "Exploitation des Capacites de Radiolocalisation des Transmissions Ultra-Large Bande dans les Reseaux Sans-Fil", Doctorate Thesis presented to L'Institut National des Sciences Appliquees de Rennes, Dec. 2005, 238 pages.

Yunjoong Park, et al, "Performance of Wireless Body Area Network Over On-Human-Body Propagation Channels", Sarnoff Symposium, Apr. 12, 2010, pp. 1-4, IEEE, Piscataway, NJ, USA.

Neal Patwari, et al., "Locating the Notes: Cooperative Localization in Wireless Sensor Networks", IEEE Signal Processing Magazine, Jul. 2005, pp. 54-69, vol. 54.

C.P Figueiredo, et al., "3D Localization for Biomedical Wireless Sensor Networks Using a Microantenna", European Conference on Wireless Technology, 2008, pp. 45-48.

Cheng Guo, et al., "Improving Accuracy of Person Localization with Body Area Sensor Networks: An Experimental Study", Consumer Communications and Networking Conference, 2009, pp. 1-5, IEEE.

Hongliang Ren, et al., "Indoor Patient Position Estimation Using Particle Filtering and Wireless Body Area Networks", Proceedings of the 29th Annual International Conference of the IEEE Engineering in Medicine and Biology Society, Aug. 23-26, 2007, pp. 2277-2280.

Francesco Chiti, et al., "An Integrated Communications Framework for Context Aware Continuous Monitoring with body Sensor Networks", IEEE Journal on Selected Areas in Communications, May 2009, vol. 27, No. 4.

"Integrating the Physical with the Digital World of the Network of the Future," SENSEI, FP7 Contract No. 215923, Deliverable No. D1.1, Jan. 2008, pp. 1-102.

Wang, G. and Filer, N., "2.5D Indoor Mapping and Location-sensing using an Impulse Radio Network," Proc. IRR Seminar on Ultra Wideband Systems, Technologies and Applications 2006, pp. 211-215, London, Apr. 2006.

Ji, W.W. and Liu, Z., "A Fuzzy Logic-Based Ranging Technique for UWB Radio Link," IEEE WICOM 2006, pp. 1-3.

Yang, W. et al., Time-Domain Investigating Path Loss Charateristics of UWB Signals in Indoor line-of-sight Environment, The 2nd IEEE International Conference on Wireless Communications, Networking and Mobile Computing, 2006, pp. 1-4.

* cited by examiner

US 9,389,303 B2

METHOD AND SYSTEM FOR USING INDIRECT PATHS OF ULTRA WIDEBAND SIGNALS TO LOCALIZE A WIRELESS COMMUNICATION NODE ON A BODY

CROSS-REFERENCE TO RELATED APPLICATIONS

This application is a National Stage of International patent application PCT/EP2011/064420, filed on Aug. 23, 2011, which claims priority to foreign French patent application No. FR 1057425, filed on Sep. 16, 2010, the disclosures of which are incorporated by reference in their entirety.

FIELD OF THE INVENTION

The present invention relates to a method and a system able to utilize indirect paths of ultra wideband signals to locate a wireless communication node possessed by a body. It applies notably to cooperative body networks implementing several wireless nodes able to communicate with one another.

BACKGROUND

With the recent technological advances in regard to integration and miniaturization, and by virtue of the development of low bitrate and very low consumption wireless communication technologies, a new application field has emerged by the name of wireless body networks or BAN, the acronym standing for "Body Area Networks". Hereinafter the terms "body network" and "BAN" will be employed interchangeably. In this type of application, wireless transmission and/or reception elements are intended to form a network on or in very close proximity to a human body. Known applications of these networks are notably the "exploded terminal" (comprising screens, keyboards, and earpieces, not co-located), sports apparatus (cardio-frequency meter, watch, pedometer on a shoe) or medical apparatus (nomadic monitoring of cardiac, cerebral and muscular activity, for example). The needs in respect of autonomous, intelligent wireless body networks capable of responding to the needs of emerging applications, in fields as varied as security, health, sport and mass entertainment, are therefore growing regularly.

Furthermore, the locating of the wireless devices constituting a BAN is of interest in numerous applications such as:
- navigation of groups of people moving around indoors and geo-located services;
- motion capture, for example, for the tracking of sports movements or for entertainment and games applications;
- posture detection, for example, for rehabilitation, the tracking of vulnerable or elderly people, and the surveillance of people operating in a disaster-stricken environment, for example firemen operating inside a blazing building.

Hence, it is desired to improve the accuracy of positioning of the nodes attached to a mobile body and/or to limit the number of radio linkups necessary in a context of cooperative location within groups of mobile wireless body networks.

The issue of location and positioning has already been studied fairly widely, notably in the context of ad hoc networks and of sensors. It will be possible notably, in this regard, to consult the publication by the authors N. Patwari, J. N. Ash, S. Kyperountas, A. O. Hero, R. L. Moses, and N. S. Correal, "Locating the nodes: cooperative localization in wireless sensor networks," *Signal Processing Magazine, IEEE*, vol. 22, July 2005, pp. 54-69, document referenced [DOC 1] subsequently. The problem of location within the framework of wireless body networks, networks commonly designated by the initials WBANs, has been explored but the proposed solutions do not utilize the characteristics of the multi-path channel, and are limited notably to basic metrics for estimating the distances between the nodes. The following publications may be cited, notably in respect of the techniques utilizing the RSSI (for "Receive Signal Strength Indicator") metric:

C. P. Figueiredo, N. S. Dias, and P. M. Mendes, "3D localization for biomedical wireless sensor networks using a microantenna", Wireless Technology, 2008. EuWiT 2008. European Conference on, 2008, pp. 45-48, document referenced [DOC 2] subsequently;

C. Guo, J. Wang, R. V. Prasad, and M. Jacobsson, "Improving the Accuracy of Person Localization with Body Area Sensor Networks: An Experimental Study," Consumer Communications and Networking Conference, 2009. CCNC 2009. 6th IEEE, 2009, pp. 1-5, document referenced [DOC 3] subsequently;

H. Ren, M. Q. Meng, and L. Xu, "Indoor Patient Position Estimation Using Particle Filtering and Wireless Body Area Networks," Engineering in Medicine and Biology Society, 2007. EMBS 2007. 29th Annual International Conference of the IEEE, 2007, pp. 2277-2280, document referenced [DOC 4] subsequently;

Choi, "System, Apparatus and Method for Keeping a Person Under Surveillance", international patent application referenced under the publication number WO 2008/143379 A1, on 27 Nov. 2008, document referenced [DOC 14] subsequently;

H. Baldus et Al., "Method for Positioning of Wireless Medical Devices with Short-Range Radio Frequency Technology", international patent application referenced under the publication number WO 2005/096568 A1, on 11 Mar. 2005, document referenced [DOC 15] subsequently;

B. E. Funk et Al., "Method and System for Locating and Monitoring First Responders", American patent application referenced under the publication number US 2008/0077326 A1, on 27 Mar. 2008, document referenced [DOC 16] subsequently;

and in respect of the techniques utilizing the DOA metric:

F. Chiti, R. Fantacci, F. Archetti, E. Messina, and D. Toscani, "An Integrated Communications Framework for Context Aware Continuous Monitoring with Body Sensor Networks", IEEE Journal on Selected Areas in Communications, vol. 27, No. 4, May 2009, document referenced [DOC 7] subsequently;

a technique utilizing the TOA or TDOA metric on the basis of the direct paths:

Y. Caritu et Al., "Motion Capture Device and Associated Method", international patent application referenced under the publication number WO 2007/093641 A2, 2007, document referenced [DOC 18] subsequently;

and a technique utilizing ultra-sounds:

G. Vannucci et Al., "System and Method for Motion Capture in Natural Environments", American patent application referenced under the publication number US 2008/0223131 A1, on 18 Sep. 2008, document referenced [DOC 17] subsequently.

In radio, the metric which is conventionally utilized is the time of flight, from which a distance is directly gleaned by knowing the speed of electromagnetic waves in air. Under real conditions, the measured time of flight is affected by an uncertainty related to several phenomena such as thermal agitation noise, multi-path phenomena and situations of obstruction of the radio linkups, these situations also being referred to as NLOS situation, standing for "Non-Line-Of-Sight".

It is notably to address these constraints that UWB ("Ultra Wide Band") technology has been studied in a locating context, this technology benefiting from intrinsic properties of good temporal resolution, be it in operation of RADAR type or of cooperative type (as in a conventional context of digital communications). This technology, which has taken hold as an alternative physical layer for wireless sensor networks (WSNs) with low bitrate or LDR (for Low Data Rate) and with low electrical consumption or ULP (for Ultra Low Power) relies on the transmission of signals for which the ratio between the width of the band at −10 dB and the central frequency is greater than 20%, or making use of an absolute band of greater than 500 MHz. In particular, these ultra wideband impulse communication systems provide for the transmission of coded and/or modulated trains of brief pulses. In the time domain, the high separating power of such signals and of the systems associated with them, directly attributable to the width of the spectral band occupied, permits the resolution of dense multi-path profiles on reception.

FIG. 1a, taken from the publication W. Yang et Al., "Time-Domain Investigating Path Loss Characteristics of UWB Signal in Indoor line-of-sight Environment", The 2nd IEEE International Conference on Wireless Communications, Networking and Mobile Computing, 2006, illustrates a scenario of UWB radio transmission between a transmitter 101 and a receiver 102 indoors, in this instance in a room with ceiling 111, floor 112, and walls 113, 114, 115. In the course of its propagation, the radio wave undergoes various types of electromagnetic interactions with the environment, including among them reflections on reflecting surfaces and/or diffractions, on sharp edges. Several copies 121, 122, 123, 124, 125 of the transmitted signal are then received at the level of the receiver 102, with different temporal and spatial characteristics. This phenomenon is better known by the name multi-path propagation. One of the benefits of UWB systems is that the good temporal resolution of the receiver makes it possible to distinguish the various copies of a received signal, and to be able to restore a sufficiently accurate image of the multi-path propagation channel (this image also being called the impulse response of the channel or CIR for "Channel Impulse Response").

FIG. 1b, taken from the publication W. W. Ji et Al., "A Fuzzy Logic-Based Ranging Technique for UWB Radio Link", IEEE WICOM 2006, illustrates an exemplary impulse response of a multi-path propagation channel. As ordinate is represented the amplitude of the response and as abscissa the time. The estimated component corresponding to the presumed direct path 131 does not necessarily correspond to the first real path actually received 132—since a pulse corresponding to an occurrence of noise and whose amplitude exceeds the detection threshold may be confused with the reception of a wave path—and/or also does not necessarily correspond to the path having the largest amplitude 133. Such is notably the case when the radio communication linkups between the nodes of a BAN are in a situation of obstruction of the communication linkups (NLOS), as shown by FIG. 1c.

In contradistinction to a data transmission context for example, where frequently the receiver seeks to synchronize itself on the strongest path (or a group of strongest paths), the location applications require the receiver to very accurately determine the component corresponding to the propagation of the first path received, presumed that of the direct path, in order to accurately measure the time of arrival, and thus to deduce therefrom the distance between the transmitter and the receiver. The following publications may notably be cited as regards the study of the characteristics of the UWB channel:

T. Zasowski et Al., "Propagation Effects in UWB Body Area Networks", IEEE ICU 2005, [DOC 19];

R. Fort et Al., "Ultra-Wideband Channel Model for Communication Around the Human Body", IEEE Journal on Selected Areas in Communications, vol. 24, N. 4, pp. 927-933, 2006, [DOC 20];

Fort, et Al., "Ultra Wide-band Body Area Channel Model", IEEE ICC 2005, pp. 2840-2844, vol. 4, [DOC 29].

FIG. 2 illustrates, through a first example gleaned from the document DOC 19 cited above, the energy contribution relating to two groups of different paths 201, 202 for an environment of "desk" type. The first group 201, which arrives in less than 1 ns at the receiver node, can be associated with the direct path. The second group 202, appearing after 6 ns, is for its part associated with a path reflected on a desk situated in proximity. The remainder of the energy arrives thereafter in a more diffuse manner.

FIG. 3 illustrates, through a second example gleaned from the document DOC 20 cited above, the richness of a multi-path profile on reception, and therefore of the information that it is possible to glean from the environment, and in particular simple reflections, which reflections give rise to noteworthy and significant echoes. By way of example, after the first "direct" path 301 occurring after 2-3 ns, a first strong reflection 302 is noted fairly distinctly around 7 to 8 ns, corresponding to a reflection on the ground (in the example with an equivalent distance traveled of close to 2.5 m).

In a last example illustrated in FIG. 4 and gleaned from the document DOC 29 cited above, the impulse response of a multi-path propagation channel is represented for a signal transmission between a node placed in the front of a human body and a node situated on a fixed anchor in proximity to the body. A first group of received signals 411 corresponds to the diffraction of the wave around the torso of the body and a second group 412 is due to the reflection on the ground.

The wireless body network locating solutions proposed in the prior art do not utilize ultra-wideband communication technology together with the diversity of the multi-path profile received (cf. the publications referenced above in this preamble DOC 2 to DOC 17).

However, certain techniques have been proposed for location and/or mapping based on UWB systems, either by utilizing solely the information related to the direct paths, or by taking into account at one and the same time the direct paths and a set of secondary paths.

The techniques utilizing solely the information related to the direct paths are firstly presented. A technique presented in (cf. DOC 18 cited above), pertains to an autonomous system for determining information representative of the motion of an articulated chain comprising at least two solid elements and at least one articulation linking said two elements. However, this technique does not utilize the multi-path diversity of the UWB channel and is based solely on the estimation of the direct paths between communication nodes. Moreover, each mobile element consists of a set of nodes which are placed at very specific sites so as to determine the motion of articulations.

Another procedure, described in the international patent application referenced under the publication number WO 2007/067821 A2, on 14 Jun. 2007, [DOC 22], is a positioning technique relying on UWB radio technology and the time of arrival (or TOA for Time-Of-Flight) metric. The invention implements multiple measurements of distances in time and in space so as to improve location accuracy. However, this procedure does not utilize the multi-path diversity of the UWB channel and is based solely on the estimation of the direct paths. Moreover, each mobile element (or terminal) carries just a single radio communication node.

The technique presented in the American patent published under the number U.S. Pat. No. 7,397,379 B2 on 8 Jul. 2008, [DOC 23], takes the form of a system making it possible to locate mobile people, indoors. This technique relies on UWB radio technology, where each person is associated with an ultra wideband radio node making it possible to carry out measurements of distances in relation to anchors or other people within communication range. However, this technique does not utilize the information relating to the secondary paths (or those arising from reflections). Moreover, each mobile element (person, etc.) carries just a single radio communication node.

Certain known locating techniques utilize secondary paths by means of a statistical or stochastic approach. In this regard may be cited:

M. Najar, J. Vidal, "Kalman Tracking for Mobile Location in NLOS Situations", in Proc. IEEE PIMRC'03, vol. 3, pp. 2203-2207, September 2003 [DOC 36];

B. Denis, L. Ouvry, B. Uguen, F. Tchoffo-Talom, "Advanced Bayesian Filtering Techniques for UWB Tracking Systems in Indoor Environments", in Proc. IEEE International Conference on Ultra-wideband, pp. 638-643, Zurich, September 2005 [DOC 37].

These techniques utilize the estimation of the times of arrival (TOA) corresponding to secondary paths (due to the obstruction of the direct radio linkups not in direct visibility or NLOS), thus inducing a bias in the measurements. This bias is generally estimated in random walk form by means of filtering procedures, in order to improve the accuracy of location.

However, this locating procedure does not utilize any relation between the times of arrival of the secondary paths and the position of the communication nodes. Moreover, each mobile element carries just a single radio communication node involved in distance measurements; stated otherwise, either the mobile element carries just a single wireless node, or the mobile element carries several nodes but only a single of these nodes is involved in the distance measurements.

Certain hybrid or semi-deterministic approaches have also been explored, such as for example that published by J. Youssef, B. Denis, C. Godin, S. Lesecq, "Enhanced UWB Indoor Tracking through NLOS TOA Bias Estimation", *IEEE Global Communications Conference* 2008 (*IEEE GLOBECOM'08*), New Orleans, USA, November-December 2008, [DOC 43]. These are based, for example, on a deterministic modeling of the angular dependencies of the bias introduced by the mobility and the presence of multi-paths related to the NLOS-type configuration of the UWB channel. However, these locating procedures do not utilize any relation between the times of arrival of the secondary paths and the position of the communication nodes. Moreover, each mobile element carries just a single radio communication node involved in distance measurements.

Other location techniques utilize secondary paths by means of a deterministic approach in order to express an explicit relation between the times of arrival of the secondary paths and the position of the nodes. For example, in:

V. La Tosa, B. Denis, B. Uguen, "Maximum Averaged Likelihood Estimation Tree for Anchor-Less Localization Exploiting IR-UWB Multipaths", in Proc. IEEE VTC-Spring'10, Taipei, May 2010, [DOC 31]; and B. Denis, V. La Tosa, B. Uguen, F. Tchoffo-Talom, "METHOD AND SYSTEM FOR AIDING ENVIRONMENTAL CHARACTERIZATION BY ULTRA-WIDEBAND RADIOFREQUENCY SIGNALS", international patent application referenced under the publication number WO/2009/077510, June 2009, [DOC 33].

The times of arrival of the paths arising from simple reflections on the walls are utilized in part to retrieve the dimensions of rooms and the relative positions of a pair of low-bitrate UWB radio nodes. A similar approach, developed by W. Guo, N. P. Filer, "2.5D Indoor Mapping and Location Sensing using an Impulse Radio Network", in Proc. IRR Seminar on Ultra Wideband Systems, Technologies and Applications 2006, pp. 211-215, London, April 2006, [0024], termed radio mapping inside buildings (or "indoor mapping"), provides for the positioning of a node or of a pair of nodes in a room with no reference point, that is to say with no node knowing its position a priori. This approach is based mainly on a geometric and deterministic interpretation of the times of arrival of the significant echoes obtained on reception. These echoes are presumed to arise from a simple reflection or from multiple reflections on the walls. Elementary mathematical relations make it possible to establish a link between the arrival time patterns obtained and the relative positions of the nodes in a room (for example the position with respect to the walls). It should be noted that this procedure allows the positioning of a single node (via the probing of its own channel in mono-static mode, that is to say with a transmitter and a receiver situated on one and the same node and operating according to the principle of radar: the node transmits a signal which is backscattered by the environment and then received by this same node), or of a pair of nodes (via the probing of the channel between these two nodes in bi-static mode, that is to say by transmission of a signal between a transmitter and a receiver situated on remote nodes). However, this procedure determines only a relative positioning, of a single node, or of a pair of nodes; furthermore, it lacks accuracy. Moreover, this procedure does not make use of any means for bounding the proximity of the nodes in relation to the reflecting surfaces (this being different from the BANs where the nodes are necessarily between 0 m and 2 m from the ground for BANs implanted on human bodies). Moreover, each mobile element carries just a single radio communication node.

Another technique, termed space regionalization (or "Geo-regioning"), makes it possible to establish a coarse positioning of the nodes by utilizing the whole of the multi-path profile received. This technique has notably been developed in the following publications:

F. Althaus, F. Troesch and A. Wittneben, "UWB Geo-Regioning in Rich Multipath Environment", IEEE 2005, [DOC 38];

F. Althaus, F. Troesch, A. Wittneben, "UWB Geo-Regioning in Rich Multipath Environment", VTC fall 2005, [DOC 39];

Frank Althaus, Florian Troesch and Armin Wittneben, Geo-Regioning for UWB Networks, IST FA, [DOC 40];

C. Steiner, F. Althaus, A. Wittneben, "On the Performance of UWB Geo-Regioning", SPAWC 2006, [DOC 41];

For example, within an asynchronous UWB network, for a given position of the transmitter node and various positions of the receiver, the profiles of power received as a function of time are initially collected, these profiles sometimes being designated by the initials PDP for "Power Delay Profile". The average of a subset of the measurements gathered for one and the same region of space (or APDP for "Average Power Delay Profile") is then associated with this same region in the guise of radio UWB signature. This first phase constitutes a learning phase. Subsequently, for the coarse positioning of a node abreast in the network, each new measurement of PDP at the level of the receiver is contrasted with the average APDP obtained for each region, and a decision is taken as regards the geographical membership of the node. The decision rule, such as it is presented in the document DOC 38 cited above, is based on the maximization of the likelihood of the new observation conditioned upon the expected mean profile for each region (ML for "Maximum Likelihood"). However, this procedure requires a calibration or learning step usually requiring an intensive campaign of measurements. Furthermore, the positioning is deliberately inaccurate, since a node is positioned as belonging to a certain region of space.

Finally, other techniques for recognizing radio imprints or patterns, also called "fingerprinting" or "pattern recognition", also make it possible to exploit the whole of the multi-path profile received. These techniques contrast current measurements, derived from the observation of the UWB signals received and carried out as dictated by the movement of a node to be positioned, with measurements or simulations carried out beforehand. These are constituents of a database, for which a correspondence is ensured with the exact coordinates of the nodes involved in the radio links. For example, the technique published by B. Denis, "Exploitation des Capacités de Radiolocalisation des Transmissions Ultra-Large Bande dans les Réseaux Sans-fil" [Utilization of the Radiolocation Capabilities of Ultra-Wide Band Transmissions in Wireless Networks], Doctoral Thesis, Chapter 4, Section 4.4 "Positionnement, résolution ULB, et diversité temporelle—Application à la reconnaissance d'empreintes ULB en milieu indoor" [Positioning, UWB resolution, and temporal diversity—Application to the recognition of UWB imprints indoors", pages 163-180, Institute National des Sciences Appliquées (INSA), Rennes, order No D05-18, Rennes, December 2005, document referenced [DOC 42] subsequently, advocates utilizing the result of the channel estimation phase directly as radio signature (for example the times of arrival of the most significant detected paths), for positioning purposes. However, this procedure requires a step of learning:
    either on the basis of a very sizable campaign of measurements carried out at various geographical positions with a very fine spacing;
    or else on the basis of an efficacious simulation tool; but in this case, it turns out to be difficult to predict waveforms realistically.

The technique presented by J. M. Elwell et Al., "Systems and Method for Positioning using Multipath Signal", in American patent application US 2008/0198072 A1 on 21 Aug. 2008, document referenced [DOC 21] subsequently, is a procedure for positioning and tracking mobile objects indoors, similar to the aforementioned fingerprinting techniques. This locating procedure utilizes the information arising from the UWB multi-path channel, namely measurements of the direct and secondary paths. The initial positioning of a mobile element is obtained, for example, by using a satellite-based positioning terminal. This initial position is thereafter associated with a multi-path profile received (solely by virtue of a filter) in order to couple this position to an initial configuration, stated otherwise a signature, of the UWB multi-path channel. Hereinafter, even if one or all the direct paths are lost (for example in a condition of obstruction of the radio linkups (NLOS), the filter thus constructed makes it possible to maintain an estimation of the position of the mobile element on the basis of the multi-path profile received.

However, this procedure requires an initial step where the mobile element determines its position accurately (by GPS). Moreover, each mobile element consists only of a single wireless node.

However, this locating procedure does not utilize any geometric relations between one or more of the secondary paths received and the position of one or more nodes attached to the mobile element (for example, the paths arising from reflections on the ground, on the wall or the ceiling). Furthermore, the locating procedure does not utilize the route related to the path reflected on the ground for the relative or absolute positioning and/or the tracking of the position of a wireless node. Moreover, this locating procedure considers only mobile elements or terminals carrying a single radio node.

SUMMARY OF THE INVENTION

An aim of the invention is to better utilize UWB multi-path diversity, in particular the presence of strong and temporally and spatially reproducible components, for example arising from reflection on the ground, wall, ceiling, to improve the locating of nodes possessed by one or more wireless body networks. For this purpose, the subject of the invention is a method for locating a first wireless communication node possessed by a mobile body, said first node being within transmission range of at least one second node also possessed by said mobile body, said nodes being able to transmit and/or receive radiofrequency signals, said method being characterized in that it comprises at least the following steps:
    performing at least one measurement of time of flight of an indirect path of ultra wideband signal transmitted between the first node and the second node, said path arising from a single reflection on a surface external to said body, between the first node and the second node;
    utilizing said time of flight measurement to locate the first node at least with respect to the second node.

The method according to the invention makes it possible, for one or more radio linkups between nodes belonging to one or more cooperative wireless body networks, to estimate, as a supplement to or in substitution for the time of flight associated with the direct path between the nodes involved in these radio linkups, the times of flight of certain indirect paths, identified as arising from simple reflections reproducible in time and in space.

The method according to the invention utilizes, at one and the same time, direct paths, when they are available, and paths arising from simple reflections reproducible in time and in space (for example reflections on the ground or a ceiling) for the positioning, absolute or relative, of nodes carried by bodies, organic or inorganic, mobile or stationary. It should be noted that the presence of a direct path is not necessary for the execution of the method according to the invention.

The method relates notably to any type of application involving a wireless body network capable of exploiting radio communications to estimate measurements of distance between communicating nodes and, ultimately, calculate the position, relative or absolute, of these nodes.

The method according to the invention uses radiofrequency transmissions based on Ultra WideBand impulse technology or IR-UWB (standing for "Impulse Radio-Ultra WideBand"). It utilizes the characteristics of the Ultra WideBand (UWB) channel to accurately measure propagation times between two or more nodes physically attached to a body or in close proximity to the latter, or optionally between a node on the body and a node situated in the near environment, in order to obtain complete or partial position data for these nodes. The position data can be obtained, either jointly with a conventional wireless digital transmission, a priori low bitrate and relying on this same UWB physical layer; or else by relying on a dedicated UWB physical layer where the digital transmissions are carried out by means of another radio technology (for example in narrow band).

In contradistinction to the techniques used in the prior art in the context of location, self-organization or motion capture of wireless body networks, the method according to the invention utilizes the characteristics of the UWB multi-path channel, namely the presence of paths arising from simple and temporally and spatially reproducible reflections.

The method according to the invention relates to multiple applications. The measurements of distance between nodes situated on a body can be used to position partially or completely, relatively or absolutely, said nodes on the body or in its near environment.

Advantageously, assumptions about the possible positions of the nodes on the body are made a priori (for example, by considering a discrete set of possible positions). According to another implementation, assumptions related to the biomechanics of the body can be considered: for example: the hand being at the end of the arm, this constrains its distance from the head. Furthermore, a learning phase can be executed on movements known in advance and a dynamic analysis aimed at correlating the signals with imprints typical of these movements can be carried out (for example, undertake a balancing movement of each arm, and then three paces forward). The method according to the invention can thus make it possible to automatically discover the position of the nodes on the body, without having to give it explicitly (for example, a node is placed on the wrist by the user, but the latter does not "configure" this node as being "a priori" placed on the wrist). This simplifies the so-called association procedure. These measurements can also make it possible:

- to check the attachment of the nodes to the body (for example to a person), and to verify the integrity of the network formed by these nodes. This integrity verification goes beyond the detection of failure of the nodes which could be carried out by simpler procedures; the method according to the invention can indeed make it possible to ascertain, for example, whether the nodes are still carried by a person in an appropriate manner (for example if a helmet is indeed on their head and not in their hand);
- to aid the reconstruction of the movement of the human body or of certain of its limbs, with the aid of this technique alone or as a supplement to sensors of inertial type (cf. DOC 18);
- to accurately measure the length of a pace or stride, by virtue of one or more measurements between the two feet, between the pelvis and one or two feet;
- to determine entries or exits of zones, when equipment not situated on the body participates in the distance measurements (example: risk zone around a dangerous machine, and vice-versa, zone exit prohibited). This case is particular since it essentially involves outside equipment.

According to an implementation of the location method according to the invention, the step of locating the first node at least with respect to the second node is performed by jointly utilizing said measurement of time of flight of the indirect path between the first node and the second node, and at least one measurement of direct path between the first node and another node possessed by the mobile body.

BRIEF DESCRIPTION OF THE DRAWINGS

Other characteristics will become apparent on reading the nonlimiting detailed description given by way of example which follows offered in relation to appended drawings which represent.

DETAILED DESCRIPTION

In the preamble, a few terms and expressions used subsequently are defined. The term "node" is understood to mean a wireless object, which can be a transmitter, a receiver or else both jointly. This wireless object can be fixed inside the mobile body, for example in the form of implants, or on its surface for example in direct contact with the limbs of a person or integrated into their clothes, so that the nodes of one and the same BAN can be mobile with respect to one another and that there exist relations of a bio-mechanical or mechanical kind governing the mobility of these nodes, these relations optionally being mobilizable within the framework of the invention.

The expression "simple reflection" is understood to mean a single reflection, as opposed to a signal reflected several times in succession.

The expression "time-reproducible reflection" is understood to mean a reflection which, all things being equal moreover, can be reproduced identically over time, whenever the reflected signal is re-transmitted.

The expression "space-reproducible reflection" is understood to mean a reflection which can be reproduced identically in space (according to the element mobility), whenever a signal is re-transmitted. This is notably the case for a floor or ceiling reflection. This reproducibility also involves the possibility of bounding or of predicting the instant (or the temporal period) of reception of a wave path.

The expression "tracking algorithm" is understood to mean an algorithm which allows the tracking, for example, of a position (or of one or more paths, or of a speed, or of an acceleration), over time (for example dynamic location). An example of such an algorithm is the Kalman filter.

The examples given subsequently are illustrated with human bodies, but other types of body, organic or inorganic (such as robots or self-guided vehicles) could be employed.

Figure 1A:
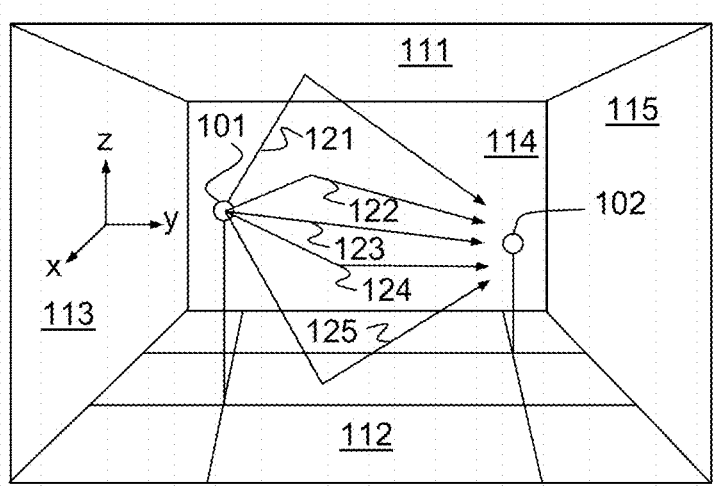
FIG. 1a, an exemplary signal in a multi-path environment; this figure has already been presented above.
Figure 1B:
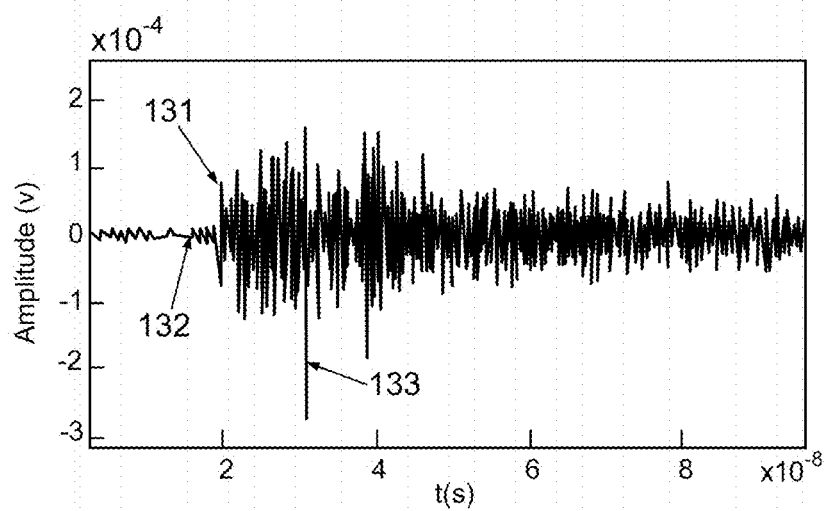
FIG. 1b, a representation over time of the power received of the signal of FIG. 1a; this figure has already been presented above.
Figure 1C:
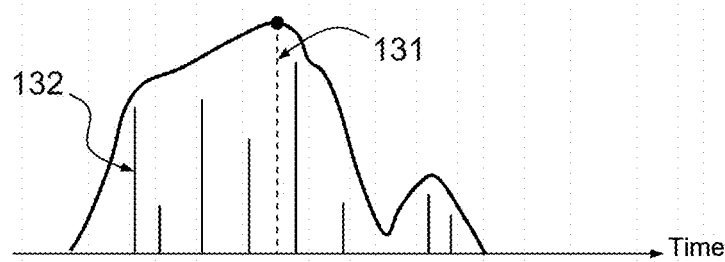
FIG. 1c, an illustration of the estimation errors that may be made in a situation of obstruction of the radio communication linkups; this figure has already been presented above.
Figure 2:
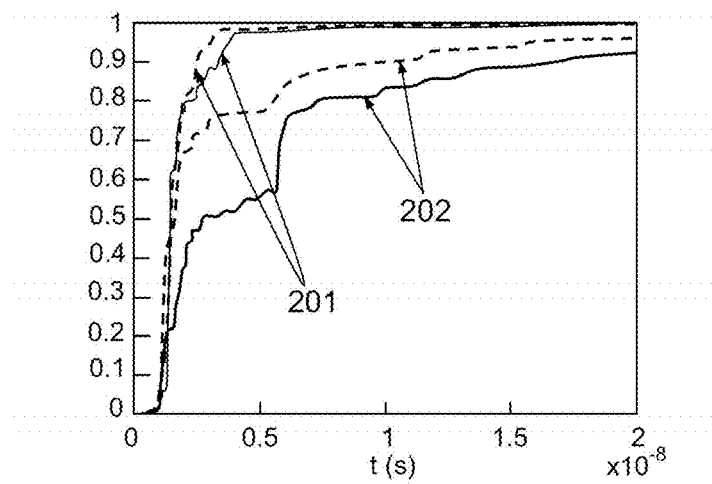
FIG. 2, a representation of the aggregated energy of the multi-path components of the channel, as a function of the elapsed time since the time of arrival of the first path received, for signal propagation between two ears of a human body; this figure has already been presented above.
Figure 3:
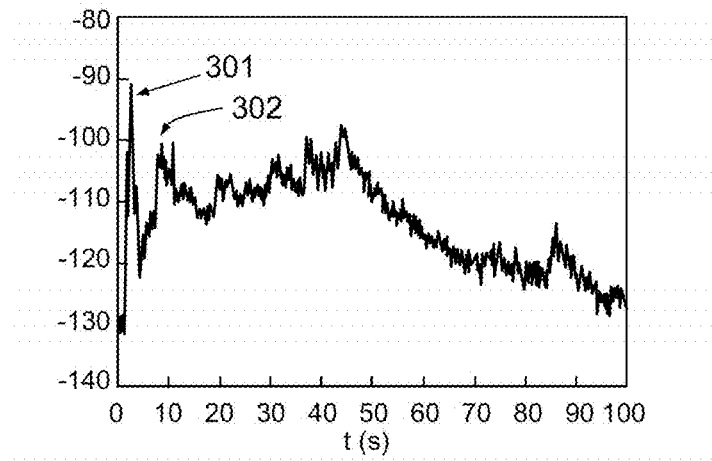
FIG. 3, a curve representing the mean energy profile of the channel as a function of time, for propagation between a node placed on the front of a human body and a node placed in the back; this figure has already been presented above.
Figure 4:
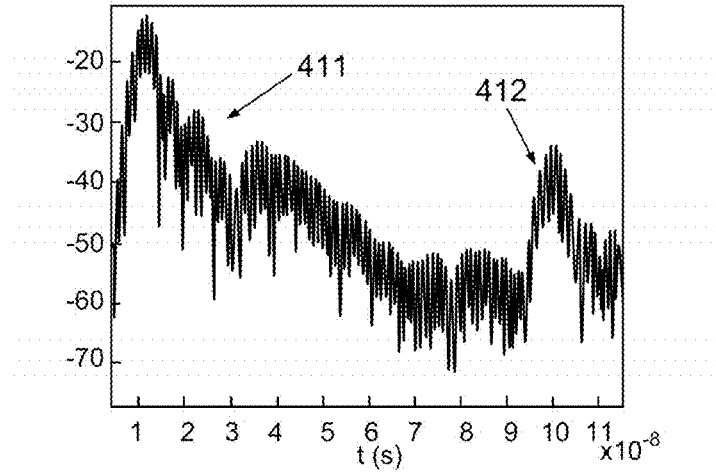
FIG. 4, the amplitude of the signal received as a function of time for propagation between an item of equipment placed on the front of the body and an item of equipment in the near environment; this figure has already been presented above.
Figure 5:
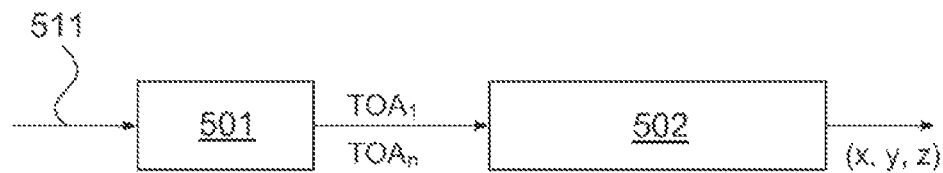
FIG. 5, a schematic illustrating two phases of the method according to the invention, FIG. 6a, a first embodiment of an ultra wideband receiver, implemented by the method according to the invention, FIG. 6b, a second embodiment of an ultra wideband receiver, implemented by the method according to the invention, FIG. 6c, a third embodiment of an ultra wideband receiver, implemented by the method according to the invention, FIG. 7, an exemplary indirect path caused by a ground reflection, FIGS. 8a and 8b, illustrating a first implementation of the method according to the invention, FIGS. 9a and 9b, illustrating a second implementation of the method according to the invention, FIG. 10, illustrating a third implementation of the method according to the invention, FIGS. 11a and 11b, illustrating a fourth implementation of the method according to the invention, FIG. 12, a first embodiment of a system according to the invention, FIG. 13, a second embodiment of a system according to the invention, FIG. 14, a third embodiment of a system according to the invention.

FIG. 5 presents a schematic illustrating two main phases 501, 502 of the method according to the invention.

The first phase 501 utilizes a UWB receiver able to restore an image of the multi-path channel, stated otherwise capable of estimating the impulse response of the wave propagation channel, and executes an algorithm for estimating the times of arrival of at least one path arising from a simple and time-reproducible and space-reproducible reflection, for example, a reflection on the floor, a ceiling, or indeed on walls or furniture. The first phase 501 therefore provides, on the basis of the radioelectric signals 511 received by a node, one or more estimations $TOA_1, \ldots, TOA_n$ of time of arrival each corresponding to a wave path, at least one path from among these paths being an indirect (or secondary) path.

Thereafter, the second phase 502 utilizes, through a positioning and/or tracking algorithm, the estimations $TOA_1, \ldots, TOA_n$ of time of arrival are utilized in order to track or position, relatively or absolutely, the node that it is sought to locate.

The first phase 501 is now detailed. It is possible to distinguish two categories of techniques for the reception of a UWB signal: coherent reception and non-coherent reception.

The coherent reception technique can rely on a sliding correlation. It makes it possible to obtain quasi-optimal performance. A very short observation window is positioned as a function of the instant of arrival of a pulse, and a calculation of the correlation rate between the signal received and a pattern (or an estimation of the signal transmitted) is carried out. This technique can, in certain cases, be fairly complex and requires fairly strong synchronization constraints, not well suited to energy-constrained systems.

The non-coherent reception technique performs a detection of energy of the signal received, by comparing the amplitude of the envelope of the signal with a given threshold. At least two variants of this technique are possible, as a function of the signal power integration interval. According to a first variant, the integration is performed over the duration of the temporal spread of the multi-paths, also called RMS Delay Spread of the impulse response of the channel (i.e. about 20 to 80 ns indoors). According to a second variant, the integration is performed on the scale of the UWB pulse transmitted (i.e. about a few ns). The first variant makes it possible to recover the maximum of energy and is therefore more suited to communication applications, whilst the second procedure allows better utilization of the high temporal resolution of the UWB signals and is therefore more suited to channel location or estimation applications.

It is important that the reconstruction of the image of the multi-path propagation channel at the level of the UWB receiver is sufficiently accurate to be able to perform the analysis of the radio link between the transmitter node and the UWB receiver node. Hence, whatever technique is adopted, at the end of this first step of receiving the radioelectric signals 511, the UWB receiver node must have in baseband an image of the multi-path channel corresponding to the radio linkup considered between two UWB transmitter/receiver nodes, and be capable of extracting the times of arrival corresponding, respectively, to the direct path and to the paths related to reproducible reflections.

Figure 6A:
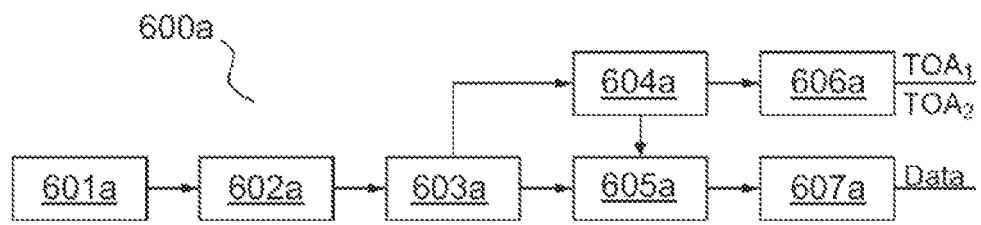

FIG. 6a presents a first embodiment of an ultra wideband receiver implemented by the method according to the invention. The receiver 600a comprises a first amplification module 601a amplifying the signal received and supplying a module for conversion to baseband 602a, which provides the received signal, frequency-transposed, to an analog-digital converter 603a sampling the signal at at least the Nyquist frequency. The analog-digital converter 603a supplies a module for estimating the impulse response 604a, on the one hand, and an RAKE receiver 605a on the other hand. The RAKE receiver (or finger-type receiver) is an optimal receiver (containing a filter matched to the channel) which on the one hand makes it possible to counter the effects of the multiple paths by phase-combining several echoes received, and on the other hand to increase the signal-to-noise ratio (SNR), thus improving the detectability/synchronization/demodulation of the signal. The signal arising from the RAKE receiver is thereafter decoded 607a in order to recover the useful data which have been transmitted. In parallel, the analog-digital converter 603a also supplies a module for the estimation of the impulse response of the channel 604a, which is thereafter utilized by a module for extracting the paths 606a.

Figure 6B:
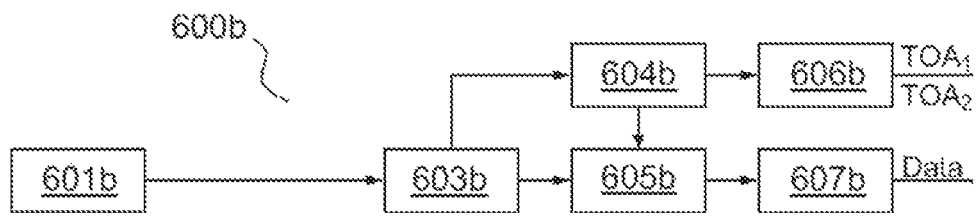

FIG. 6b presents a second embodiment of an ultra wideband receiver implemented by the method according to the invention. This second embodiment 600b is similar to the first embodiment 600a of FIG. 6a, with the exception of the sampling frequency, which is lower so as, inter alia, to minimize the energy consumption, to the detriment, however, of a degradation in performance.

Figure 6C:
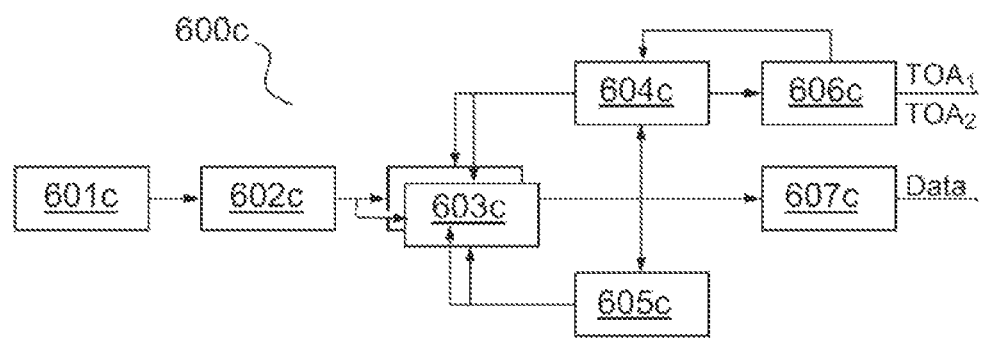

FIG. 6c presents a third embodiment of an ultra wideband receiver implemented by the method according to the invention. The third embodiment 600c comprises an integrator module 603c supplied by a search module 604c of the two head paths, and a sequential synchronization search module 605c. In this third embodiment, a sampling of the ultra wideband signal is performed at a tempo which is a multiple of the pulse repetition frequency (1/PRP=15.6 MHz for example, PRP being the pulse repetition period), with a small coefficient, for example equal to four. This means that for each period PRP, it will be possible to effect four correlations. On the contrary, the first embodiment of FIG. 6a samples at the Nyquist frequency (in the example, 15.6 MHz*64, i.e. about 1 GHz) so as to make it possible to do a maximum of correlations in parallel for each pulse repetition period, or 64 in the example. In the example, during the phase of synchronization performed by the module 605c, it is necessary to perform a test for all the 64 possible positions, therefore with the third embodiment, it is necessary to test them one after the other; this entails a sequential search, whereas everything can be done in parallel in the case of the first embodiment.

The step 606a of extracting the times of arrival, corresponding to the direct path and to a set of reproducible indirect paths (reflection on the ground, ceiling, etc.) can be difficult, notably in the context of the wireless body networks which are characterized by a very high rate of radio linkups in an obstruction situation, that is to say in a NLOS situation.

Known algorithms make it possible to estimate the times of arrival related to the direct paths. It is notably possible to cite the generalized maximum likelihood (GML) algorithm which is based on the CLEAN algorithm published in J. Hogborn, "Aperture Synthesis with a Non-Regular Distribution of Interferometer Baselines", Astron. and Astrophys. Suppl. Ser, vol. 15, 1974.

Moreover, the extraction of the paths arising from simple and reproducible reflections can be facilitated, for example by applying a windowing or a path tracking, on the basis of the knowledge of the temporal position of the direct path (on the basis of the last available location or synchronization), and/or of a priori knowledge of the geometry of the environment, and/or of geometric and bio-mechanical constraints, for example, the disposition of the transmitter and/or receiver nodes on a body, as well as the height of the body in relation to the ground. The windowing consists in selecting only a part of the impulse response of the channel. Indeed, by virtue of the knowledge of the height of the mobile body (or of the wireless node) and of the nature of the reflection (floor, ceiling, etc.), the maximum distance that can be traversed by such a reflected path, is determined. It is henceforth possible to apply a temporal windowing to the impulse response of the channel, so as to exclude the irrelevant paths. The extraction of the secondary paths arising from simple reflections can also be carried out by virtue of a tracking algorithm, which on the basis of the knowledge of the previous temporal positions (estimated previously) of these paths, estimates the current positions of these paths.

It should be noted that during the step of extracting the paths, it is also possible to seek to exploit radio metrics, such as for example the "RMS delay spread", so as to facilitate the discrimination between the LOS and NLOS situations, and/or to assist and improve the accuracy of the positioning algorithms. This "Delay Spread" metric makes it possible to assess the significant temporal spreading, or dispersion of the delays, related to multi-paths. This spreading tends to increase under a condition of obstruction of the radio linkups, or NLOS, and constitutes a tool for deciding the state of the channel.

The second phase 502 will now be disclosed. Said phase utilizes the measurements of the times of arrival, $TOA_1 \ldots TOA_n$, arising from the first phase 501 and corresponding to the direct path and to a set of simple and time-reproducible and space-reproducible reflections, to position or track the nodes of one or more mobile body networks.

By way of nonlimiting illustration, the times of arrival considered subsequently are those related to the direct paths and to the paths arising from reflections on the ground, even if other types of paths may be taken into account such as for example reflections on a ceiling or, by assuming that the nodes have pre-knowledge of the environment, reflections in relation to other obstacles such as walls or surrounding objects.

Figure 7:
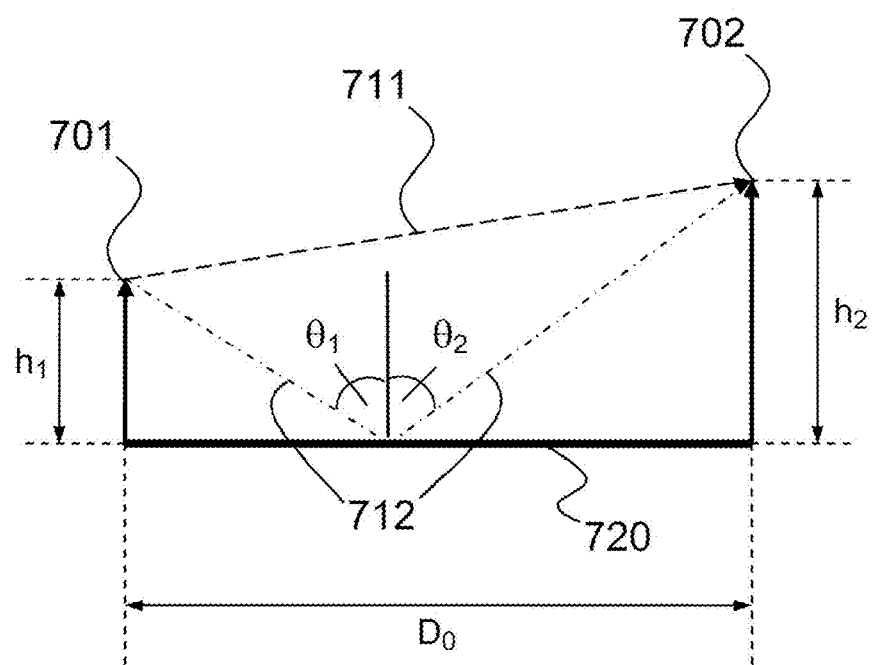

FIG. 7 illustrates an exemplary indirect path caused by a ground reflection. A radioelectric signal is transmitted by a transmitter node 701 to a receiver node 702. A first path 711 between the two nodes 701, 702 is the direct path, stated otherwise, a straight segment linking the two nodes. A second path 712, represented in FIG. 7 by an alternation of points and of lines, is an indirect path arising from a reflection on the ground 720. Recall that the angle of incidence θ1 of the second path 712 on the ground is equal to the angle of reflection θ2.

By virtue of the use of a UWB receiver, such as described above, the receiver node 702 is capable of estimating at least one part of the impulse response of the channel and of extracting the times of arrival, $TOA_1$ and $TOA_2$, corresponding respectively to the direct path 711 and to the indirect path 712.

By considering coordinates expressed in a 3D reference frame, and by assuming that the nodes are synchronized, the relation between the times of arrival, and the distances and coordinates of the nodes can be expressed as follows:

$$D_1 = \sqrt{D_0^2 + (h_2-h_1)^2} \approx TOA_1 \times c$$

$$R_1 = \sqrt{D_0^2 + (h_2+h_1)^2} \approx TOA_2 \times c$$

where:
$D_0$ represents the ground distance between the transmitter 701 and the receiver 702;
$D_1$ represents the length of the direct path 711;
$R_1$ represents the length of the indirect path 712;
c represents the speed of the electromagnetic waves;
$TOA_1$ and $TOA_2$ are the measured times of arrival which correspond to the times of flight of the signals which propagate along the first path 711 and the second path 712.
$h_1$ and $h_2$ are the respective heights at which the transmitter 701 and the receiver 702 are situated.
This example can be extended to the case of asynchronous systems, in which case the times of flight are estimated by means of a protocol of N-Way ranging type (such as published, for example in D. Macagnano and Al., "MAC Performance for Localization and Tracking in Wireless Sensor Networks", In Proceedings of the 4th Workshop on Positioning, Navigation and Communication (WPNC), March 2007), in addition to the estimation of the times of arrival.
At this juncture, the receiver node 702 can utilize these two distance measurements to refine the calculation of its absolute or relative position in relation to the transmitter node 701.

The positioning and/or tracking algorithm takes as input the various distance measurements and associated metrics, and provides as output the information required (relative positions, absolute positions, for example) for a given application (navigation, positioning, motion capture, for example). Several algorithms can be employed to perform the positioning or the tracking of the receiver node 702, notably nonlinear optimization algorithms, the linearized least squares procedure, trilateration procedures, Kalman filters (including Extended Kalman Filters, or EKF) and particle filters.

Several implementations of the method according to the invention are now illustrated in a neither restrictive nor exhaustive manner, in order to better present the content of the invention. For the sake of simplification, it will be considered subsequently that the indirect paths are due to reflections on the ground.

Figure 8A:
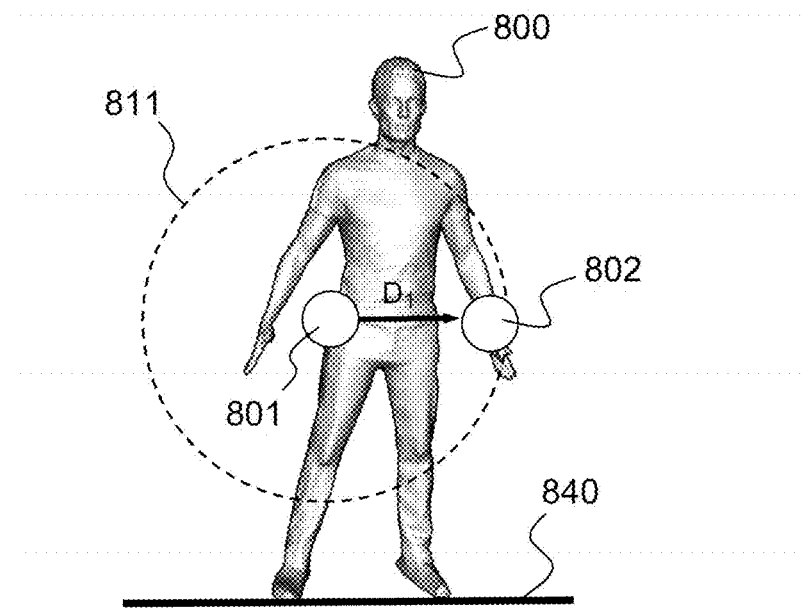
Figure 8B:
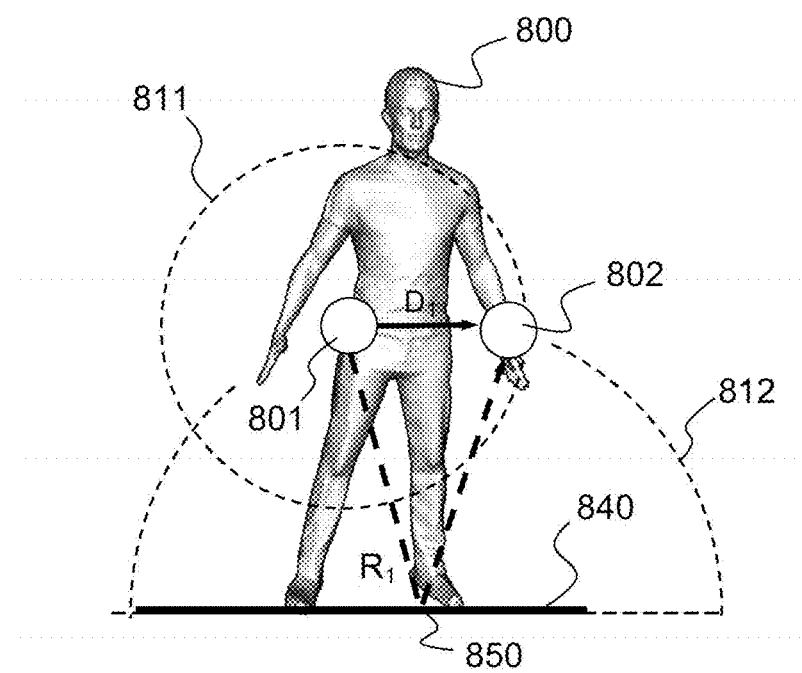

FIGS. 8a and 8b illustrate a first implementation of the method according to the invention in which the positioning of a second node 802 attached to a body is performed in relation to a first node 801 attached to the same body.

In the example, the nodes 801, 802 are attached to a human body 800 in motion. The position of the first node 801 is assumed known in a reference datum local to the body or in relation to an existing arbitrary reference datum. The first node 801 transmits a signal to the second node 802. The second node 802 executes the method according to the invention by estimating, on the one hand, the length $D_1$ of the direct path and, on the other hand, the length $R_1$ of the indirect path resulting from a reflection on the ground 840.

In the example, the measurement of length of the indirect path $R_1$ corresponding to the reflection on the ground 840 corresponds to about twice the height of the first node 801. It can then be deduced that the second node 802 is situated in proximity to the horizontal plane passing through the first node 801. Moreover, as the measurement of length $D_1$ of the direct path is greater than the width of the hip of the body, it can be deduced that the second node 802 is situated at the level of the wrist to the right of the first node 801.

Thus, as illustrated by FIG. 8a, measurement of only the length $D_1$ of the direct path would not have made it possible to position the second node 802, since the second node 802 could have been situated on the surface of a sphere 811 of radius $D_1$ centered on the first node 801, represented dashed in FIG. 8a. By virtue of the taking into account, for the same radio linkup, of an additional time of flight measurement due to the reflection on the ground, the second node 802 has further information that it can utilize to deduce its relative or absolute position, by virtue of geometric and/or biomechanical relations and constraints. As illustrated in FIG. 8b, the second node 802 is situated at the intersection of a first sphere 811 of radius $D_1$ centered on the first node 801 with a second sphere 812 centered on the point of reflection 850 on the ground 840. It should obviously be noted that the higher the number of measurements of time of flight of paths (direct and indirect), the more favorable in respect of accurate positioning of the second node 802.

It should be noted that according to another implementation of the method according to the invention, it is the second node 802 which transmits a signal to the first node 801, it then being possible for the time of flight associated with the path to be retransmitted to the second node 802 through another communication link.

Figure 9A:
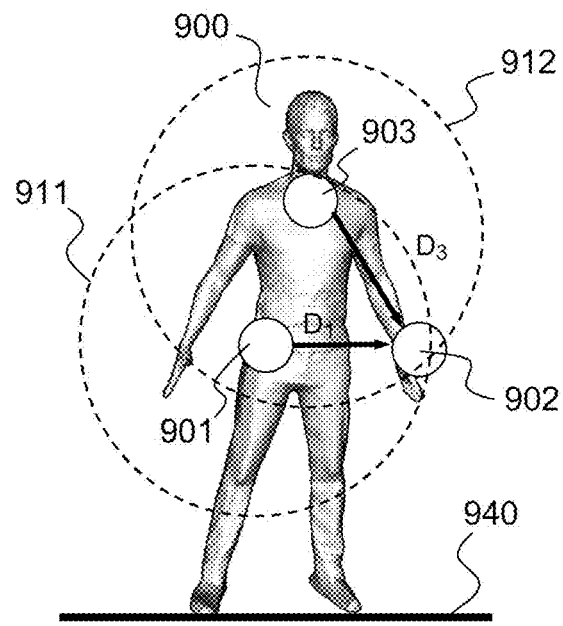
Figure 9B:
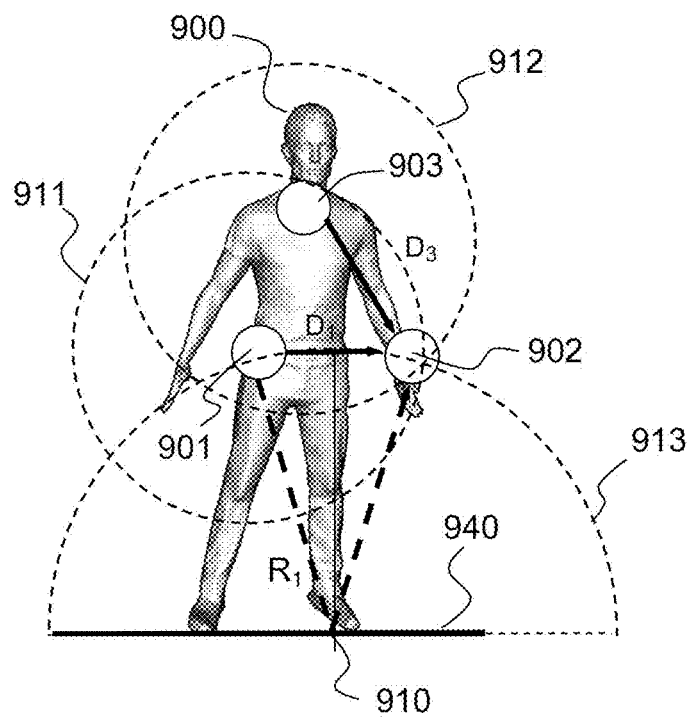

FIGS. 9a and 9b illustrate a second implementation of the method according to the invention. In the example, three nodes 901, 902, 903 are attached to a human body 900. The first node 901 and the third node 903 have already known positions. The method is used to position the second node 902 with respect to the first and third nodes 901, 903.

The first node 901 transmits a signal to the second node 902 and the third node 903 also transmits a signal to the second node 902. The second node 902 thereafter executes the method according to the invention by estimating the length $D_1$ of the direct path between the first node 901 and the second node 902, the length $R_1$ of the indirect path between the first node 901 and the second node 902, resulting from a reflection on the ground 940, and the length $D_3$ of the direct path between the third node and the second node 902.

As illustrated in FIG. 9a, measurements of only the length of direct paths $D_1$ and $D_3$ do not make it possible to accurately estimate the position of the second node 902, since certain geometric ambiguities persist. In the example of FIG. 9a, the second node 902 can be positioned at the level of the circle marking the intersection of two spheres, the first sphere being of radius $D_1$ and centered on the first node 901, the second sphere being of radius $D_3$ and centered on the third node 903. By virtue of the additional measurement of the length $R_1$ of the indirect path, the second node 902 can be more accurately positioned by removing certain geometric ambiguities, since a new positioning constraint is added in the form of a surface of a third sphere centered on the point of reflection 950 on the ground.

Figure 10:
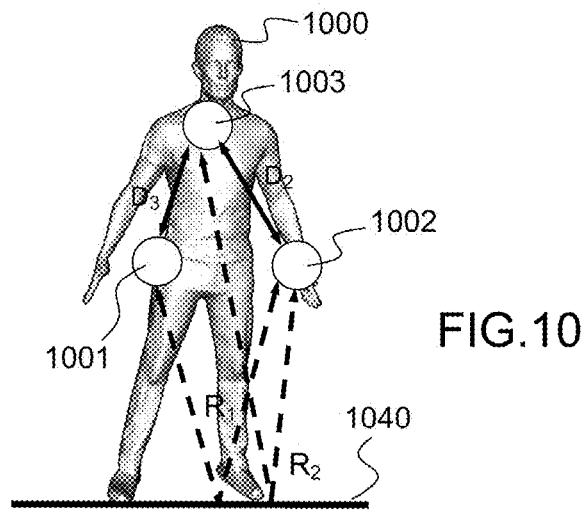

FIG. 10 illustrates a third implementation of the method according to the invention in which a set of nodes attached to one and the same body and whose positions are a priori unknown is positioned in a relative manner.

In the example, three nodes 1001, 1002, 1003 are attached to a human body 1000. The method is used to position each node with respect to the other two. Signals are transmitted between each pair of nodes, and path length measurements are performed, in the example, as follows:

estimate, between the second node 1002 and the third node 1003, the length $D_2$ of the direct path and the length $R_2$ of the indirect path reflected on the ground 1040;

estimate, between the first node 1001 and the third node 1003, the length $D_3$ of the direct path (in the example, no measurement of indirect path is performed between these two nodes);

estimate, between the first node 1001 and the second node 1002, the length $R_1$ of the indirect path reflected on the ground 1040 (in the example, no measurement of direct path is performed between these two nodes).

The utilization of the multi-path diversity of the UWB channel, notably by taking account of the path length $R_1$, $R_2$ measurements related to the reflections on the ground, makes it possible to minimize the geometric ambiguities that could occur if relying only on measurements related to the direct paths. It is thus possible to reconstruct, relatively, the positioning of the nodes, with respect to one another.

This type of purely relative positioning can be useful for numerous applications, such as for example, the reconstruction of the motion of a person, the checking of the attachment of the nodes to the person, the verification of the integrity of the network formed by these nodes.

Figure 11A:
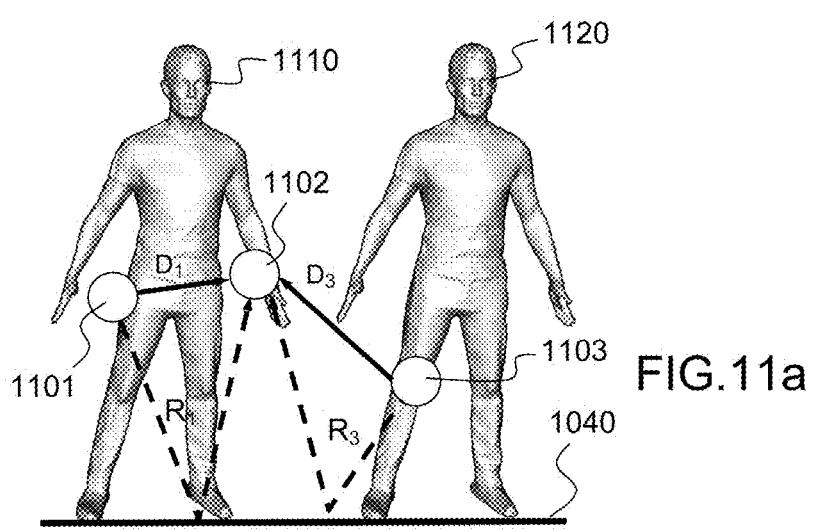
Figure 11B:
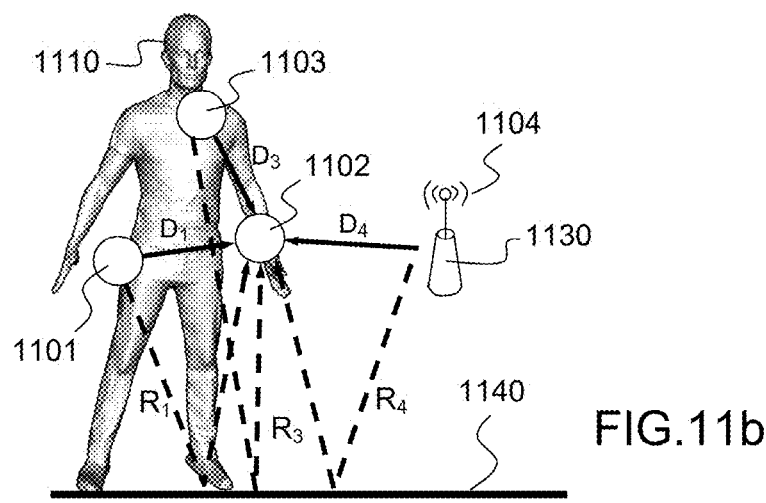

FIGS. 11a and 11b illustrate a fourth implementation of the method according to the invention in which the positioning of a mobile node 1102 performed in relation to other nodes 1101, 1103 situated within communication range.

In the example of FIG. 11a, a first node 1101 and a second node 1102 are situated on a first human body 1110, and a third node 1103 is situated on a second human body 1120, within communication range of the second node 1102. The positions of the first node 1101 and of the third node 1103 are known. One seeks to position the second node 1102. Accordingly, path length measurements are performed, as follows:

estimate, between the first node 1101 and the second node 1102, the length $D_1$ of the direct path and the length $R_1$ of the indirect path reflected on the ground 1140 (intra-BAN measurements);

estimate, between the third node 1103 and the second node 1102, the length $D_3$ of the direct path and the length $R_3$ of the indirect path reflected on the ground 1140 (inter-BAN measurements).

All the measurements performed in the example of FIG. 11a are due to transmissions of signals between the nodes of the same body network (BAN related to the first human body 1110); these measurements $D_1$, $R_1$, $D_3$, $R_3$ are called intra-BAN measurements and are utilized to position the second node 1102.

In the example of FIG. 11b, a first node 1101, a second node 1102 and a third node 1103 are situated on a first body 1110 which moves around within communication range of a fixed base station 1130, which is also called an "anchor". The base station 1130 comprises a node 1104. One seeks to determine the absolute position of the second node 1102. Accordingly, path length measurements are performed, as follows:

estimate, between the first node 1101 and the second node 1102, the length $D_1$ of the direct path and the length $R_1$ of the indirect path reflected on the ground 1140 (intra-BAN measurements);

estimate, between the third node 1103 and the second node 1102, the length $D_3$ of the direct path and the length $R_3$ of the indirect path reflected on the ground 1140 (intra-BAN measurements);

estimate, between the node 1104 of the anchor 1130 and the second node 1102, the length $D_4$ of the direct path and the length $R_4$ of the indirect path reflected on the ground 1140 (anchor-BAN measurements).

Here again, the second node 1102 can, by using a positioning or tracking algorithm (for example a trilateration procedure, the least squares procedure, a filtering), utilize the measurements of lengths $R_1$, $R_2$, $R_3$, of indirect paths to improve the accuracy of its positioning.

As illustrated by FIGS. 8a, 8b, 9a, 9b, 10, 11a, 11b, an advantage of the present invention is to make the location system benefit, at lesser cost, from additional measurements related to ground reflections, notably so as to:

remove the geometric ambiguities which may appear when the measurements of distances are incomplete;

improve the accuracy of the positioning by virtue of the redundancy and the richness of the measurements obtained; or allow relative positioning as a function of geometric and/or biomechanical constraints of the body.

One or the other of the aforementioned advantages is obtained as a function of the configurations in which the communication nodes are situated.

Thus, if for a given radio linkup, no direct path can be performed, then the time of flight measurements associated with indirect paths make it possible, despite this absence, to obtain an estimation of the distance between the two nodes of said radio linkup.

If, on the contrary, a time of flight measurement is performed for the direct path, then the obtaining of time of flight measurements related to indirect paths makes it possible to reduce the geometric ambiguities and/or to improve the accuracy of the positioning of the nodes by virtue of the redundancy and the richness of the measurements obtained. In the absence of these distance measurements due to the indirect paths, it would be necessary to multiply the measurements in relation to other nodes, whether this be to determine an absolute position (for example by trilateration) or a relative position (by cooperative positioning).

Several nonlimiting embodiments of the device according to the invention are now presented. Depending on the mode chosen, the nodes may either be transmitters, receivers, or else both at one and the same time and the distance metric may be different, for example TOA or TDOA. Moreover, the calculation of the positions on the basis of the measurements of distances obtained may either be centralized, that is to say performed by a single calculation unit (for example in a node of a BAN), or decentralized, stated otherwise performed by several distributed calculation units (for example, calculation units distributed among several nodes of a BAN).

Furthermore, the measurements of distances obtained may arise:

uniquely from indirect paths between nodes, these paths arising from simple reflections; or from direct paths between nodes and from indirect paths arising from simple reflections for all the radio linkups used by the location method; or else from direct paths solely for certain radio linkups and from direct paths and/or from simple reflections for other radio linkups used by the location method.

It should therefore be noted that the presence of measurements of direct paths is not necessary in order to execute the method according to the invention. Sometimes, these measurements of direct paths are impossible to obtain, since obstructions prevent direct communication between two nodes.

Thus, the presence or otherwise of certain types of paths depends mainly on the propagation conditions (for example if an obstruction intervenes between the transmitter and the receiver). The presence or otherwise of these paths conditions the type of positioning that can be obtained, for example absolute positioning or relative positioning. The absence of certain measurements of path lengths may occur if for example it is systematically sought to obtain the maximum of possible information but the detection of the direct path is lacking for obstruction reasons. On the contrary, the absence of these measurements may sometimes result from a deliberate choice, being limited for example for energy saving reasons, to the reflected paths. For example, if it is possible to anticipate an obstruction situation, having regard to the model of bio-mechanical mobility of the mobile body and the latest estimated positions, it will be chosen not to use measurements pertaining to direct paths.

Figure 12:
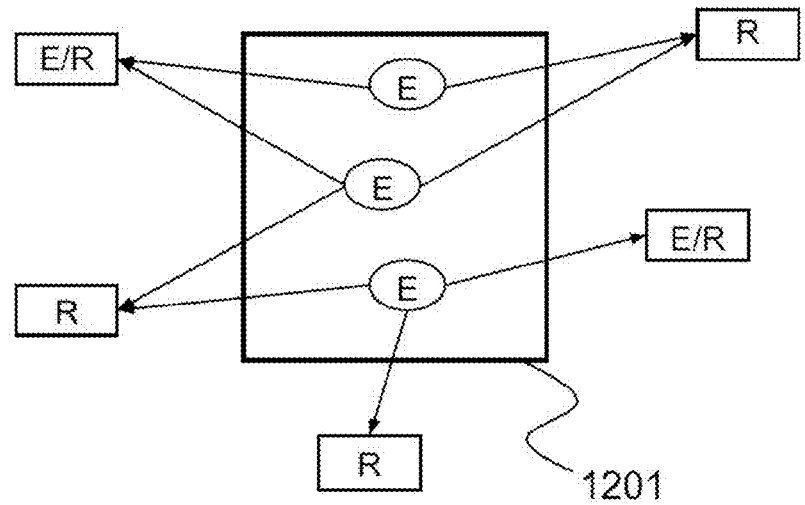

FIG. 12 illustrates a first embodiment of a system according to the invention in which a mobile body 1201 comprises nodes of transmitter type only. The mobile body 1201 can constitute a body network (BAN). The transmitter nodes are represented by letters "E" in the figure. Within communication range of the mobile body 1201 are situated communication nodes in the form of receivers, represented "R" in the figure, or receiver transmitters represented "E/R" in the figure. These nodes suitable for reception make it possible to ensure a radiofrequency link with the mobile body 1201 via direct and/or indirect paths and, ultimately, enable the transmitter nodes of this mobile body 1201 to be located. The arrowed lines represent the signals transmitted by the transmitters.

A conceivable metric for determining the distances between the nodes is the TDOA procedure which requires synchronization of the "receiver" and/or "transmitter/receiver" nodes. In this example, the calculation of the positions of the nodes of the mobile body 501 is performed, preferably, in a centralized manner and at the level of the infrastructure, that is to say for example at the level of the surrounding receiver nodes.

Figure 13:
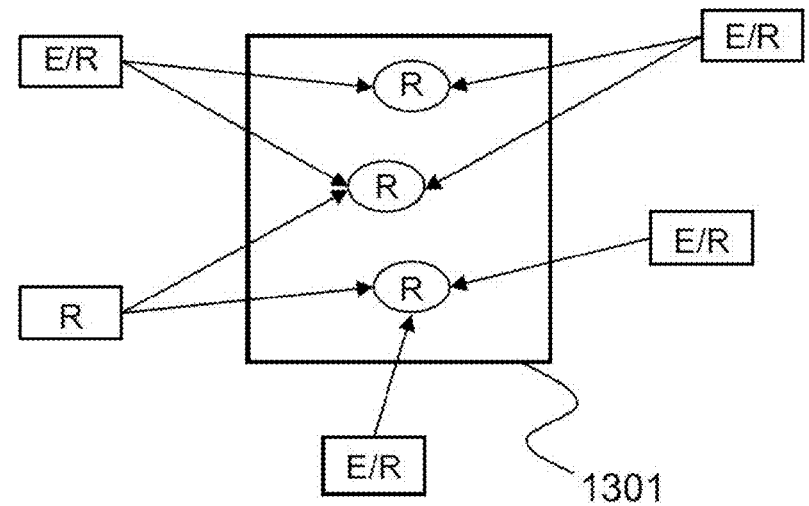

FIG. 13 illustrates a second embodiment of a system according to the invention in which a mobile body 1301 comprises nodes of receiver type only, represented by letters "R" in the figure. Within communication range of the mobile body 1301 are situated communication nodes in the form of transmitters, represented "E" in the figure, or transmitters/receivers, represented "E/R" in the figure. These nodes suitable for transmission make it possible to ensure a radiofrequency link with the mobile body 1301 via direct and/or indirect paths and, ultimately, enable the receiver nodes of this mobile BAN 1301 to be located. The arrowed lines represent the signals transmitted by the transmitters. A conceivable metric for determining the distances between the nodes is of temporal type, for example the TOA metric or the TDOA metric which requires synchronization of the "transmitter" and/or "transmitter/receiver" nodes.

Moreover, in this example, the calculation of the positions of the nodes of the mobile body 1301 can be performed at the level of the body 1301 itself,—in a centralized manner at the level of a node or by calculation distributed over several nodes of the body 1301. The calculation of the positions of the nodes of the mobile body 1301 can also be performed at the level of the infrastructure if the distance measurements performed at the level of the receiver nodes of the mobile BAN 1301 are communicated to the infrastructure via other wireless communication means, for example.

Figure 14:
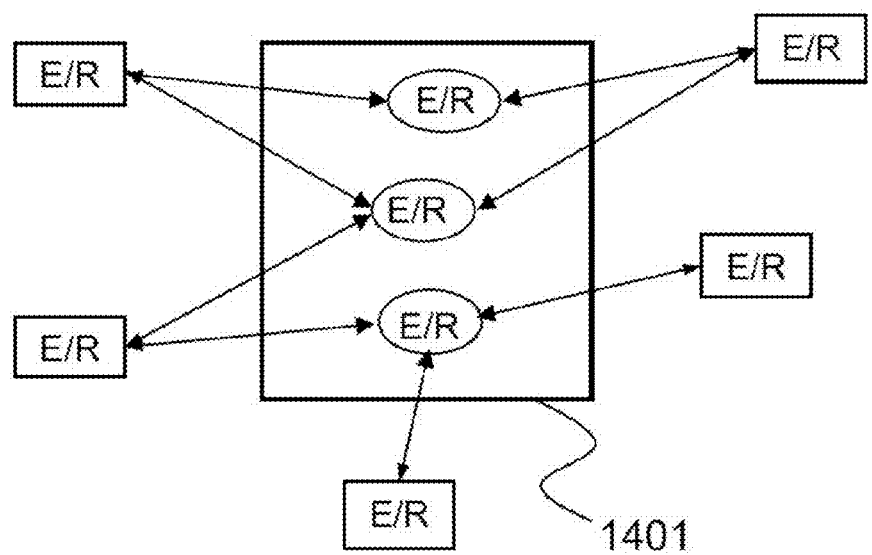

FIG. 14 illustrates a third embodiment of a system according to the invention in which a mobile body 1401 comprises nodes of transmitter/receiver type only, represented by letters "E/R" in the figure. Within communication range of the mobile body 1401 are situated communication nodes in the form of transmitters/receivers, also represented "E/R" in the figure. The TOA and TDOA metrics can be used for this embodiment and the calculation of the positions of the nodes of the mobile body 1401 can be performed equally well at the level of the mobile body 1401,—in a centralized manner at the level of a node or by calculation distributed over several nodes of the body 1401—or at the level of the infrastructure.

The examples of FIGS. 12, 13, and 14 are neither restrictive nor exhaustive, and it is for the person skilled in the art to choose the appropriate embodiment as a function, notably, of the application and constraints, for example as a function of the energy consumption aimed at and of the synchronization of the nodes. In particular, these examples can be combined so that a mobile body comprises, for example, at one and the same time transmitter nodes and receiver nodes.

The extraction of several propagation paths or groups of propagation paths between two nodes considerably improves the performance of the prior art solutions in which there is, at best when it is available, the knowledge only of the distance corresponding to the shortest time of flight between the two nodes. In particular, it might be desired to separate the direct path between the two nodes of the path resulting from a reflection on the ground, which reflection is present and may be utilized in the great majority of applications. Furthermore, in an indoor environment, one might also wish to isolate a path of reflection on the ceiling or on any other wall or item of furniture whose presence could be inferred.

The method according to the invention also relies upon (known) deterministic geometric relations which relate the times of arrival of these same paths to the positions of the nodes involved in this (these) radio linkup(s). One may thus to hope to afford information redundancy (for example by affording new "virtual-direct-paths" via the secondary paths detected) and/or to enhance the Euclidean rigidity of the problem of location (in the graph theory sense), by removing all or some of the geometric ambiguities (present if relying solely on the direct path). Ultimately, the utilization of the indirect path makes it possible:

to improve the accuracy of locating the radio nodes (for example positioning and/or tracking);

to compensate/make up for the any direct-path losses caused on certain linkups, either by the obstruction of the carrier body (for the intra-BAN linkups) or of any outside obstacle (for the inter-BAN linkups or in relation to an infrastructure in relation to radio devices in a close vicinity);

to reduce the number of radio linkups necessary to ensure a certain level of accuracy of locating the radio nodes.

It should be noted that the execution of the method according to the invention assumes good reproducibility (that is to say coherence over time and in space) and good observability (that is to say satisfactory detectability of the paths within the impulse response) of the multi-path components reflected and utilized. In this respect, favor is accorded to the utilization of the reflections on the ground, and then on the ceiling, and then to a lesser extent on walls or any other vertical reflecting surface of the environment (if the distance from the BAN concerned to these surfaces is small enough to permit reliable detection/estimation of the corresponding path). Furthermore, it may be useful to explicitly enhance the presence of the reflected paths or components (for example to improve the signal-to-noise ratio of these paths, notably by utilizing software and/or hardware techniques (for example directional antennas).

The method and the device according to the invention can be employed, for example, in military applications, security or rescue applications, for which cost or consumption are not limiting factors. More broadly, the method and the device according to the invention are usable in devices intended for the general-public, for example for motion capture, posture detection, navigation, augmented social networks calling upon the point-to-point linkups between a pair of objects, and geo-located services. By way of illustration, the device according to the invention can allow the location of groups of mobile people moving around in indoor spaces where satellite-based location devices are unusable, such as for example commercial centers, airports, museums, and industrial sites. It can allow users to be situated in a zone and, for example, to determine itineraries of interest or to benefit from an augmented-reality technique.

The method according to the invention can allow mobile users to locate themselves inside a building, to calculate routes to centers of interest, to search for contacts in geographical proximity or to benefit from certain services of Web 2.0 type as a function of their geographical positions, such as for example, social networks, augmented reality.

Another type of conceivable application is the guidance and the positioning of mobile objects, for example robots, self-guided vehicles indoors or outdoors, for example in industrial, home-automation settings, on roads. A possible exemplary scenario is the "Robot Taxi" whose objective is to optimize and to coordinate in real time the movement of self-guided taxis as a function of the travel and traffic conditions in town. Reference may notably be made to the SENSEI publication: Integrating the Physical with the Digital World of the Network of the Future, FP7 Contract Number: 215923, deliverable number D1.1, January 2008. Another exemplary scenario is the real-time tracking and positioning of vehicles at the level of the production lines in the automotive industry.

The invention claimed is:

1. A method for locating a first wireless communication node attached to a mobile body, said first node being within transmission range of at least one second node also attached to said mobile body, said nodes being able to transmit or receive radiofrequency signals, said method comprising:

performing at least one measurement of time of flight of an indirect path of ultra wideband signal transmitted between the first node and the second node, said path arising from a single reflection on a surface external to said body, between the first node and the second node; and utilizing said time of flight measurement to locate the first node at least with respect to the second node.

2. The locating method as claimed in claim 1, wherein the time of flight measurement is performed by estimating an impulse response of a transmission channel between the first node and the second node and by extracting from said impulse response at least one time of flight corresponding to a path having undergone a reflection between its transmission and its reception.

3. The locating method as claimed in claim 1, wherein the indirect path arises from a reflection on the ground.

4. The locating method as claimed in claim 1, wherein:
either said signal is transmitted by the first node and received by the second node or said signal is transmitted by the second node and received by the first node.

5. A method for locating a first wireless communication node attached to a mobile body, said first node being within transmission range of at least one second node also attached to said mobile body, said nodes configured to transmit or receive radiofrequency signals, said method comprising the following steps:
performing at least one measurement of time of flight of an indirect path of ultra wideband signal transmitted between the first node and the second node, said path arising from a single reflection on a surface external to said body, between the first node and the second node; and
utilizing said time of flight measurement to locate the first node at least with respect to the second node,
wherein the first node and the second node are attached to one and the same articulated body provided with known bio-mechanical constraints, a position of the second node on said articulated body being known, the method comprising a step of joint utilization of said known position of the second node, of said bio-mechanical constraints, and of the measured time of flight of said indirect path to determine the location of the first node.

6. The locating method as claimed in claim 5, in which the step of locating the first node at least with respect to the second node is performed by jointly utilizing said measurement of time of flight of the indirect path between the first node and the second node, and at least one measurement of direct path between the first node and another node attached to the mobile body.

7. The locating method as claimed in claim 1, in which the step of locating the first node at least with respect to the second node is performed by jointly utilizing said measurement of time of flight of the indirect path between the first node and the second node, and at least one measurement of direct path between the first node and another node attached to the mobile body.

\* \* \* \* \*